United States Patent [19]

Teodorczyk

[11] Patent Number: 5,629,083
[45] Date of Patent: May 13, 1997

[54] METHOD OF MANUFACTURING CELLULOSIC COMPOSITE AND PRODUCT THEREOF

[75] Inventor: Zygmunt Teodorczyk, Batavia, Ill.

[73] Assignee: Masonite Corporation, Chicago, Ill.

[21] Appl. No.: 483,690

[22] Filed: Jun. 7, 1995

Related U.S. Application Data

[62] Division of Ser. No. 342,778, Nov. 21, 1994.

[51] Int. Cl.$^6$ .......................... B32B 5/14; C08F 283/00; C08G 8/28; C08L 61/00
[52] U.S. Cl. ................ 428/308.8; 528/129; 528/147; 528/148; 528/155; 528/163; 528/164; 525/480; 525/534; 525/540; 264/121; 264/126; 428/330; 428/311.71; 428/317.1; 428/326
[58] Field of Search ................ 528/129, 147, 528/148, 155, 163, 164; 525/480, 534, 540; 264/121, 126; 428/308.8, 311.7, 317.1, 326, 330

[56] References Cited

U.S. PATENT DOCUMENTS

| | | | |
|---|---|---|---|
| 2,981,652 | 4/1961 | Peterson et al. | 154/140 |
| 3,076,772 | 2/1963 | Christ | 523/129 |
| 3,364,167 | 1/1968 | Imai et al. | 524/723 |
| 3,631,152 | 12/1971 | Johnson et al. | 525/503 |
| 3,911,046 | 10/1975 | Ackermann et al. | 524/596 |
| 4,229,557 | 10/1980 | Feinauer et al. | 525/480 |
| 4,234,658 | 11/1980 | Chow | 428/403 |
| 4,414,379 | 11/1983 | Koyama et al. | 528/137 |
| 4,430,380 | 2/1984 | Honel et al. | 428/254 |
| 4,433,119 | 2/1984 | Brode et al. | 525/442 |
| 4,433,120 | 2/1984 | Chiu | 525/501 |
| 4,454,298 | 6/1984 | Koyama et al. | 528/137 |
| 4,536,245 | 8/1985 | Shiau et al. | 156/307.3 |
| 4,862,948 | 9/1989 | Laitar | 164/526 |
| 4,961,795 | 10/1990 | Detlefsen et al. | 156/62.2 |
| 5,011,886 | 4/1991 | Buschfeld et al. | 524/596 |
| 5,074,946 | 12/1991 | Daisy | 156/307.3 |
| 5,202,403 | 4/1993 | Doering | 527/403 |
| 5,334,445 | 8/1994 | Ruyter et al. | 428/284 |
| 5,378,544 | 1/1995 | Gnatowski et al. | 428/529 |
| 5,389,716 | 2/1995 | Graves | 524/510 |
| 5,391,340 | 2/1995 | Mirous et al. | 264/112 |

FOREIGN PATENT DOCUMENTS

| | | |
|---|---|---|
| 3906024A1 | 12/1989 | Germany . |
| 53-6397 | 1/1978 | Japan . |

OTHER PUBLICATIONS

International Search Report; International Application No. PCT/US 95/14497, dated May 3, 1996.

Primary Examiner—Samuel A. Acquah
Attorney, Agent, or Firm—Marshall, O'Toole, Gerstein, Murray & Borun

[57] ABSTRACT

A process for the production of modified phenol-aldehyde resins includes the use of a modifier selected from melamine, urea, and other suitable nonvolatile organic compounds. The phenolic component of the resins preferably includes a difunctional phenolic compound. The inventive resins resist precuring and are particularly useful in blowline blending procedures.

20 Claims, 1 Drawing Sheet

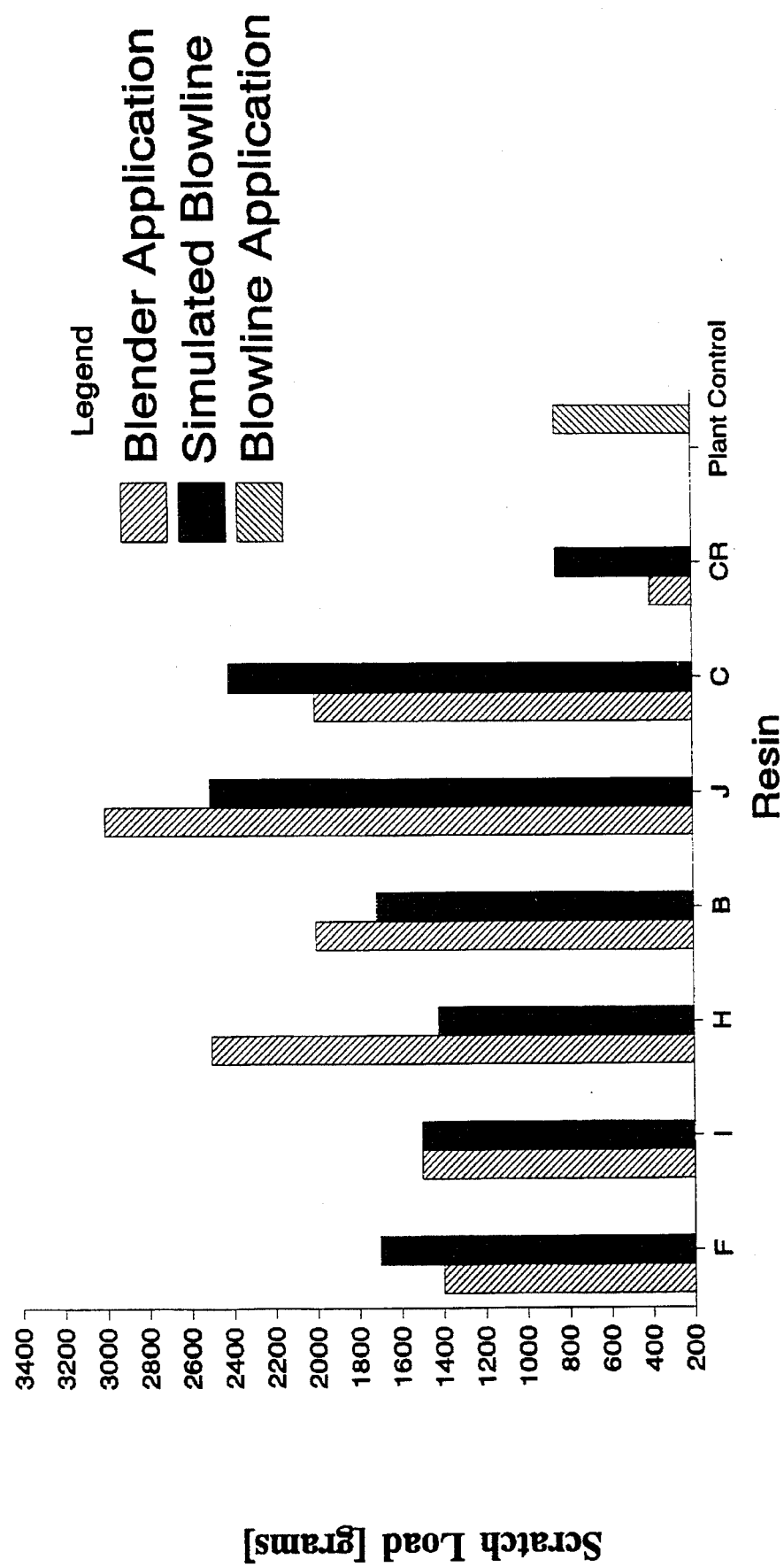

METHOD OF MANUFACTURING CELLULOSIC COMPOSITE AND PRODUCT THEREOF

CROSS REFERENCE TO RELATED APPLICATION

This application is a division of copending, commonly assigned application Ser. No. 08/342,778, filed Nov. 21, 1994.

BACKGROUND OF THE INVENTION

1. Field of the Invention

The invention relates generally to modified phenol-aldehyde resins and products incorporating such resins and, more particularly, the invention relates to the production of a modified phenol-formaldehyde resole resin useful in the manufacture of molded wood composites, e.g., fiberboard.

2. Brief Description of Related Technology

Man-made pressed boards, such as fiberboard, can be molded to have a three-dimensional shape and various design and structural features found in natural wood. Types of useful man-made boards are referred to by the following terms, for example: (a) fiberboards such as hardboard, softboard, and medium density fiberboard ("MDF") and (b) chipboards such as particleboard and oriented strandboard ("OSB"). Composites of these boards are also useful. These materials can be used to produce boards, siding materials, doorskins, and other structural or building products, for example.

Various processes can be used to produce wood composites such as those mentioned above. The principal processes for the manufacture of fiberboard, for example, include (a) wet felted/wet pressed or "wet" processes, (b) dry felted/drypressed or "dry" processes, and (c) wet felted/dry pressed or "wet-dry" processes. Synthetic resins, such as phenol-aldehyde resins, are often used as binders in these processes.

Generally, in a wet process, cellulosic fillers or fibers (e.g., woody material which is subjected to fiberization to form wood fibers) are blended in a vessel with large amounts of water to form a slurry. The slurry preferably has sufficient water content to suspend a majority of the wood fibers and preferably has a water content of at least 90 percent by weight ("weight percent"). The slurry is deposited along with a synthetic resin binder, such as a phenol-formaldehyde resin, onto a water-pervious support member, such as a fine screen or a Fourdrinier wire, where much of the water is removed to leave a wet mat of cellulosic material having, for example, a moisture content of about fifty percent, based on the weight of dry cellulosic material. The wet mat is transferred to a press and consolidated under heat and pressure to form the molded wood composite.

A wet-dry forming process can also be used to produce wood composites. Preferably, a wet-dry process begins by blending cellulosic or wood fiber material in a vessel with large amounts of water. This slurry is then blended with the resin binder. The blend is then deposited onto a water-pervious support member, where a large percentage (e.g., 50 percent or more) of the water is removed, thereby leaving a wet mat of cellulosic material having a water content of about 40 wt. % to about 60 wt. %, for example. This wet mat is then transferred to a zone where much of the remaining water is removed by evaporation. The dried mat preferably has a moisture content of less than about 10 wt. %. The dried mat is then transferred to a press and consolidated under heat and pressure to form the wood composite which may be a flat board or a doorskin article, for example. The product can have any other desired shape depending on the intended use of the product.

In a dry process, the cellulosic fibers are generally conveyed in a gaseous stream or by mechanical means, rather than by a liquid stream. Cellulosic fibers supplied from a fiberizing apparatus (e.g., a pressurized refiner) can be first coated with a thermosetting resin binder, such as a phenol-formaldehyde resin, in a blowline blending procedure. The resin-coated fibers from the blowline can then be randomly formed into a mat by air blowing the fibers onto a support member. The fibers, either before or after formation of the mat, can optionally be subjected to pre-press drying, e.g., in a tube-type dryer. The mat, typically having a moisture content of less than 30 wt. % and preferably less than 10 wt. %, is then pressed under heat and pressure to cure the thermosetting resin and to compress the mat into an integral consolidated structure.

When medium density fiberboard production was introduced in the mid 1960s, fiber was first dried (e.g., in a drum type dryer) and then mixed with a resin such as a urea or urea-melamine resin, usually in blenders of the same type as are commonly used in particleboard plants. However, today, in the production of consolidated cellulosic articles, many processes include blowline blending of cellulosic material and a binder resin prior to the application of the dry process described above, for example. In blowline blending, the binder resin (generally saturated with steam from the fiberizing apparatus) is blended with the fiber with the aid of air turbulence. The blowline procedure takes place between the fiberizing apparatus and the pre-press dryer. Blowline blending offers several advantages, including ease, quality, and efficiency of blending of the fibers and the binder resin. For example, blowline blending (a) evenly distributes the binder throughout the fiber; (b) requires no special blending equipment; (c) reduces the amount of plant space and equipment necessary for equipment (e.g., for blenders); (d) obviates the down time necessary for blender cleaning; (e) allows for a smaller dryer tube diameter; (f) lowers the required temperature of the inlet to the dryer to which the blended material is sent; and (g) lowers the required temperature of the dryer to which the blended material is sent.

In many blowline processes, resins are applied to the wet fibers at about 200° F.–250° F. (about 93° C.–121° C.) (e.g., approximately 230° F. or 110° C.) and then are passed into a dryer (preferably a tube-type dryer) having an inlet temperature of about 320° F. to about 400° F. (about 160° C. to about 200° C). The inlet temperature depends upon dryer efficiency and/or the diameter of the dryer entry. Even though water evaporation holds the fiber temperature at an estimated 221° F. (about 105° C.) and the fiber is held at the elevated temperature in the dryer for only a matter of seconds, resins are put through quite a temperature shock. Depending on their reactivity and other properties, binders can lose a substantial amount of their efficiency or binding ability during this procedure.

When using any of the above-described processes, it is desirable that the binder resin be as efficient as possible. Resin efficiency, which can be affected by a number of factors, includes the ability to use a relatively low amount of resin for a given amount of filler. Resin efficiency is a particular concern when using blowline addition in a dry process.

One factor which will lower resin efficiency is the reactivity or precure of the resin, e.g., in the blowline or in the press prior to consolidation. To the extent that the resin precures (e.g., in the blowline due to the elevated temperatures therein), bonding efficiency can be lost and products manufactured with the resin may not perform satisfactorily.

Although many known phenolic resins have an advantage in that they are relatively slow curing (and therefore help to avoid undesirable precuring in the blowline), many of these phenolic resins can nevertheless exhibit a loss of efficiency while applied via a blowline procedure. Even phenolic resins which are very precure resistant (e.g., those which are produced at a low molar ratio of formaldehyde to phenol and with a low amount of catalyst) require more solids content when applied via blowline blending than when applied otherwise (e.g., via fiber blenders) for equal performance. It is therefore hypothesized that loss of resin efficiency is not solely caused by the resin's precure. Therefore, when selecting a resin for use in a blowline, not only is it desirable that the resin be resistant to precure, but it is desirable that the resin have other characteristics which make it suitable for blowline application.

For example, besides resin precure, loss of resin flow properties is another condition which can cause unsatisfactory performance of a resin in blowline application.

Loss of resin flow properties can be caused by "dryout," which is an insufficient amount of moisture in the system. Because resin flows much better in the presence of moisture, a very low moisture content can cause insufficient resin flow properties. Resin flow can be improved by increasing the amount of the moisture, however, this can be done only up to a certain level, since increased moisture content prevents resin cure.

In addition, it is hypothesized that advancing resin condensation during the drying step causes a loss of resin flow properties. Advancing resin condensation refers to the reaction between methylolated phenols (e.g., phenol reacted with formaldehyde) and/or between methylolated phenol and phenol itself (and/or between higher molecular weight species thereof). These reactions lead to higher molecular weight polymers. The higher the degree of condensation (the higher the molecular weight), the worse the resin flow.

In addition to dryout and advancing resin condensation, loss of resin flowability might also be caused by volatilization of the low molecular weight part of the resin. In particular, volatilization of free phenol (which acts as a resin plasticizer) under the hot and saturated conditions of the blowline can cause a loss of resin flowability.

Further, exposure of the resin to the hot expanded fiber in the dryer may cause excessive penetration of the resin into the wood fibers or particles. Such a phenomenon can also undesirably reduce the resin's efficiency.

When resin efficiency is compromised, if the resin level is not sufficiently raised to overcome the lower efficiency, products manufactured with the resin are likely to be of unsatisfactory quality. For example, molded wood composites made in such circumstances can have poor surface quality. Poor quality is indicated where the molded wood composite exhibits poor internal bonding and strength. Further, poor surface quality is shown where there appears to be layers within the composite which are "flaky" and can be easily peeled away. Where the wood composite has poor surface quality, the wood composite may easily break apart and the product is therefore unsatisfactory.

It is therefore desirable to produce a binder resin which performs satisfactorily under all pressing conditions, such as in a blowline in a dry process. More particularly, it would be desirable to produce a binder resin which has the following properties: (a) acceptable precure resistance against blowline blending conditions, (b) good flowability, (c) lack of excessive advancing resin condensation in the blowline, (d) lack of volatilization in the presence of steam, and (e) lack of overpenetration into the fiber (e.g., a resin having limited solubility). It is desirable to produce a wood composite product, e.g., fiberboard, which has significantly improved hardness of fiberboard surface, compared to commercial phenol-formaldehyde resins.

It is further desirable to produce a binder system which is convenient to use in a process such as those described above.

SUMMARY OF THE INVENTION

It is an object of the invention to overcome one or more of the problems described above.

Accordingly, the invention provides a modified, phenoloaldehyde resin which is useful in the manufacture of wood composites. The invention also provides a process for producing a molded wood composite which includes blowline addition of a resin to a wood filler.

According to the invention, a resin is produced by condensing formaldehyde or a formaldehyde derivative with a phenolic component in the presence of an alkaline catalyst. The resin is preferably modified with a compound from one of the following classes: (1) melamine, (2) urea, and (3) other suitable nonvolatile organic compounds, including combinations thereof. The equivalent molar ratio of aldehyde to phenolic compounds is preferably in the range of about 0.55:1 to about 0.8:1, and more preferably in the range of about 0.65:1 to about 0.75:1. The phenolic component of the resin preferably includes a difunctional phenolic compound.

The inventive resin is preferably utilized in a blowline blending procedure in a forming process to produce a molded wood composite, e.g., fiberboard. The modified phenol-aldehyde resin offers acceptable precure resistance against blowline blending conditions, good flowability, bonding efficiency, lack of volatilization in the presence of steam, and preferably lack of overpenetration into fiber due to the resin's limited solubility. The resins synthesized in accordance with the invention result in significantly improved hardness of the wood composite's surface while compared to commercial phenol-formaldehyde resins.

Further objects and advantages of the invention will be apparent to those skilled in the art from the following detailed description, taken in conjunction with the FIGURE and the appended claims.

BRIEF DESCRIPTION OF THE FIGURE

The sole FIGURE illustrates a comparison of the tested scratch loads of various binder resins.

DETAILED DESCRIPTION OF THE INVENTION

According to the invention, a modified phenol-aldehyde resin is produced which can be beneficially used in conjunction with blowline addition in a dry process for the production of a man-made composite product, such as a pressed composite board including a cellulosic filler.

The inventive process preferably includes first reacting an aldehyde and a phenolic component (such as phenol and/or a difunctional phenolic compound) under heat and basic pH to achieve methylolation of the phenolic compound. After the methylolation stage, the reactor is heated, and held at an elevated temperature to perform a condensation reaction which produces a polymer of desired chain length. The condensation product of the phenolic component and the aldehyde is then further reacted with a modifier selected from the group consisting of melamine, urea, and other suitable nonvolatile organic compounds, including combinations thereof. After a desired viscosity is reached, the product is preferably cooled to ambient temperature for storage.

As described above, problems which might cause loss of resin efficiency include (a) precure of the resin under blowline conditions, (b) poor flowability, (c) overpenetration of the resin into the fiber, (d) volatilization in the presence of steam, and (e) excessive advancing resin condensation in the blowline. The inventive resin preferably avoids all of these problems to provide a resin with high efficiency.

In order to avoid precure of the resin, the inventive resin preferably includes a phenolic component which comprises a difunctional phenolic compound. Further, termination of the resin's cook with the modifiers of the invention will aid in avoiding precure by lowering the free formaldehyde content of the resin.

In order to avoid poor flowability (e.g., caused by resin dryout), it is desirable to produce a resin possessing a capability for adequate flow, for example, even when the line supplying the binder resin to a blowline is dried out. The inventive resin improves resin flow, for example, by altering the resin's structure by introducing a difunctional phenolic compound, e.g., o-cresol.

The problem of excessive resin penetration into the fiber is preferably overcome by providing a resin possessing a low water tolerance. The low water tolerance of the inventive resin is extremely beneficial since resins characterized by low water tolerance (e.g., low water solubility) generally precipitate under the blowline conditions on the fiber and generally do not overpenetrate.

The relatively high molar ratios of formaldehyde to phenolics in the invention preferably will yield a resin having better bonding efficiency than the low molar ratio, precure resistant commercial resins. Use of such high molar ratios of formaldehyde to phenolics will preferably (a) allow the reaction of any available free phenolic monomers with formaldehyde and (b) provide enough high molecular size distribution in the resin to prevent the possible volatilization of phenol and/or o-cresol, and/or low molecular size portion of the resin with steam under blowline conditions. Higher molar ratios of formaldehyde to phenolic compounds usually facilitates resin branching, and this way preferably (a) broadens the molecular size distribution of the resin and (b) increases the average molecular weight of the resin. The higher molecular size weight portion of resin is not volatile with steam in the blowline, and good flowability is preferably improved by the presence of a difunctional phenolic compound, for example.

The term "free phenolic monomers" refers to phenolic compounds (e.g., phenol or o-cresol) which have not been condensed to form a longer chain. Although the presence of free phenolic monomers in the resin is beneficial because these relatively small molecules can serve both to plasticize the resin and facilitate its flow, the inventive resin does not require such monomers, due to the improved characteristics thereof.

The incorporation of o-cresol into the resin formulation increases dryout resistance, minimizes precure and increases the resin flow, due to the difunctionality of o-cresol, as defined herein. Use of such a difunctional compound delays the hardening reaction of the resin and decreases crosslink density which results in a less rigid polymer (i.e., cured resin) and semi-thermoplastic character in the resin. The relatively high molecular size distribution of obtained resins and lack of free monomers prevents any resin volatilization in the blowline. The low water tolerance in combination with higher molecular size distribution preferably prevents any excessive resin overpenetration into the fiber.

Turning to the preferred composition of the inventive resin, the relative amounts of the components are preferably selected so as to improve the performance of the inventive resin.

The "equivalent molar ratio" (or "EMR") of aldehyde to phenolic compound is preferably in the range of about 0.55:1 to about 0.8:1, and more preferably in the range of about 0.65:1 to about 0.75:1. The EMR is a ratio of the number of moles of aldehyde to the number of free positions on the phenolic compound (e.g., phenol and/or o-cresol, as described in detail below) available for reaction with formaldehyde. Thus, for phenol itself, 0.65 EMR can also be stated as 1.95:1 "real" molar ratio of aldehyde to phenol (0.65 EMR multiplied by 3 available reactive positions on phenol). Where o-cresol or another difunctional phenolic compound is used, for example, an EMR of 0.65 is equivalent to a "real" molar ratio of formaldehyde to o-cresol of about 1.3 (0.65 multiplied by 2 available positions).

The molar ratios of aldehyde to phenolic compound (e.g., phenol and/or o-cresol) for the inventive method are preferably much higher than for commercial blowline phenolformaldehyde resins, and preferably approach those ratios for typical fast cured phenolic resins.

The preferred molar ratio of modifier (e.g., melamine and/or urea) to phenolic compounds is in the range of about 0.5 to about 3 moles per 10 moles of phenolic compounds (i.e., about 0.05 to about 0.3 moles modifier per mole of phenolic compounds), and more preferably a molar ratio of about 1:10. As stated above, the termination of the resin's cook with a modifier such as melamine and/or urea lowers the overall molar ratio of formaldehyde to compounds which react with formaldehyde, and therefore increases the resin's precure resistance. (Both melamine and urea are nonvolatile with steam and both lower the free formaldehyde level in the resin.) However, at the preferred molar ratio of modifier to phenolics of 1:10, the final molar ratio of formaldehyde to phenolics is still much higher than for precure resistant PF resins so resin strength remains high.

The phenolic compounds used in accordance with the invention are preferably phenol and/or o-cresol. The phenolic component of the invention (at least for commercial scale production) will preferably include the use of at least some amount of o-cresol, due to the relatively low cost of o-cresol. In addition, a mixture of cresols, phenol, and xylenols can also be used; this mixture is also particularly useful on a commercial scale due to its relatively low cost. (This mixture is called cresylic acid, and the relative amounts of its components vary depending upon the supplier.)

Where a mixture of phenol and o-cresol is used, the molar amount of phenol is preferably in the range of about 30 to about 99.9 percent of the molar amount of the total of phenol plus o-cresol. More preferably, the molar amount of phenol is in the range of about 50 to about 70 percent of the molar amount of the total of phenol plus o-cresol. (This preferred ratio can be alternatively stated as a molar ratio of phenol to o-cresol in the range of about 10:0 to about 3:7, and more preferably about 7:3 to about 1:1.) These ratios will preferably improve the surface properties (particularly the hardness) of the fiberboard product; generally, higher o-cresol contents will result in better surface properties. However, the advantage of using high levels of o-cresol must be considered in light of the fact that o-cresol (a) raises the resin's cost over the use of phenol itself and (b) requires the process to use higher caustic levels due to the limited water solubility of a cresol resin. The higher the amount of caustic generally results in higher water sensitivity of the final product, which is not desirable.

Although the inventive method preferably includes use of a mixture of phenol and o-cresol, any "difunctional" (which may also be referred to as "bifunctional") substituted phenolic compound may be used as all or a portion of the phenolic component in accordance with the invention. The term "difunctional phenolic compound" is used to refer to phenolic molecules which are capable of reacting with no more than two molecules of formaldehyde (i.e., the phenolic compound exhibits difunctional reactivity with formaldehyde). The hydroxyl group of the phenolic compound is ortho- and para-directing (i.e., the hydroxyl group generates reactivity of the carbon positions which are ortho and para to the hydroxyl group). Therefore, examples of such difunctional compounds useful with the invention include the following: o-cresol, p-cresol, p-tertbutylphenol, p-nonylphenol, p-dodecylphenol, difunctional xylenols (i.e., excluding 3,5-xylenol), and mixtures of these compounds. O-cresol is a preferred compound due to its low cost and availability. Because these compounds are difunctional they will produce a linear polymer. Linear polymers will preferably provide the inventive resin with better flow properties in the absence of moisture and/or are thermoplastic. Further, linear polymers will preferably allow the inventive resin to be more dryout resistant.

Preferably, a source of formaldehyde is used as the aldehyde component of the inventive resin. Most preferably, a formalin solution containing 50 weight percent formaldehyde in water is utilized. Although the preferred aldehyde of the invention is formaldehyde, other aldehydes can be used as modifiers or partial replacements for formaldehyde. Suitable formaldehyde derivatives include paraformaldehyde. Other aldehydes which could be used with the invention include acetaldehyde, furrural, paraformaldehyde, and glyoxal, for example.

A preferred process for producing the inventive modified phenol-aldehyde resin will now be described in detail, wherein in combination with phenol itself, o-cresol is utilized as the difunctional phenolic compound described above. However, it is to be understood that the invention is not limited to the use of o-cresol, but encompasses all difunctional phenolic compounds as described above. It should also be understood that there are many modifications and alternatives to the following example and no limitations should be understood therefrom. The invention contemplates, for example, variations of reaction temperature, sequence of the addition of reactants, and selection of reactants.

According to the preferred process, formaldehyde, phenol, o-cresol, and water are first combined in a reaction vessel. As stated above, the "equivalent molar ratio" (as defined above) of formaldehyde to phenol and/or o-cresol is preferably in the range of about 0.55–0.8 to 1 (and more preferably about 0.65–0.75 to 1).

These ingredients are mixed, followed by the addition of an alkaline catalyst to the mixture, preferably at a temperature below about 45° C. (Alternatively, the phenolic component and caustic can first be mixed, followed by the later addition of the aldehyde at about 65° C.) The alkaline catalyst is preferably caustic soda (NaOH), but may also be, for example, potassium hydroxide (KOH) or combinations of NaOH and KOH. Because the reaction between formaldehyde and a phenolic compound under alkaline conditions is highly exothermic, the temperature of the reactants will immediately begin to rise, and the reaction temperature therefore should be carefully controlled. To ensure safe control of the reaction temperature, the increase in temperature can be paused at various predetermined temperature plateaus. Such a pause may be accomplished by vacuum and/or water cooling. Once the temperature begins to drop under the vacuum and/or water cooling, the temperature may then be allowed to increase.

The pH in the methylolation stage is preferably greater than 9, however, as stated above, care must be taken to control the exothermic reaction. Further, as also stated above, the amount of caustic is preferably limited so as to reduce the water sensitivity of the final resin product. The reaction preferably uses a molar ratio of caustic soda to phenolic compounds in the range of about 0.05:1 to about 1:1, and more preferably about 0.1:1 to about 0.2:1, for example about 0.15:1.

After methylolation, the free formaldehyde content of the reaction mixture is preferably minimal. The reactor is then preferably heated to between about 85° C. and 100° C., and more preferably about 90° C., and held at this temperature to obtain a polymer of a desired chain length. Once the chain length nears its desired level, the temperature of the reaction mixture is preferably lowered. The chain length is selected depending upon the reactants, the reaction conditions, and the desired characteristics of the final resin product. As will be understood by those of skill in the art, the chain length is generally measured as a function of the viscosity of the reaction mixture. According to a preferred formulation, the desired viscosity at this point is approximately equal to A-B on the Gardner-Holt viscosity scale or about 40 cps to about 60 cps at about 50 percent solids. However, this viscosity is variable depending upon the reactants and reaction conditions. For example, the viscosity can be approximately A2-A1 on the Gardner-Holt scale.

After (a) methylolation and (b) the condensation reaction is advanced to a desired level, an amount of a modifier is next added to this initial condensation product or "prepolymer." The modifier compounds which may be reacted with the phenol-formaldehyde prepolymer include the following classes of compounds: (1) melamine, (2) urea, and (3) nonvolatile organic compounds which are capable of co-polymerizing with formaldehyde-based resins.

Nonvolatile organic compounds suitable as modifiers because they are capable of co-polymerizing with formaldehyde-based resins include phenolic compounds with relatively high melting points, such as bisphenol-A (4,4'-isopropylidenediphenol), p-tert-butylphenol, and/or resorcinol.

The modifier compound(s) are preferably reacted without the addition of further caustic, followed by continuation of the reaction until a desired chain length (e.g., measured as a desired viscosity) is reached. Preferably, the reaction is continued until the point where substantially all of the modifier compound (e.g., melamine) has been solubilized. By way of example, suitable viscosities range from approximately D-E on the Gardner-Holt viscosity scale to approximately K-L on that scale.

The molar ratio of the modifier (e.g., melamine and/or urea) to the phenolic compounds is preferably in the range of about 0.5–3 moles per 10 moles of phenolics (and preferably about 1:10). Use of this ratio (a) increases the resin's precure resistance (b) and lowers the free formaldehyde level in the resin. The modifiers, such as melamine and urea, are beneficial for these purposes because they are capable of reacting with formaldehyde. Although melamine and/or urea are preferably added to the reaction to terminate the resin's cook (i.e., complete the reaction), any nonvolatile organic compound capable of co-polymerizing with formaldehyde-based resins can be used, as further described herein.

To the extent that there is a reaction between the modifier (preferably melamine and/or urea) and the phenol-formaldehyde resin prepolymer, under the preferred alkaline conditions, such a reaction likely takes place at the terminal ends of the prepolymer.

Following the condensation of the modifier compound, the reactor is cooled to ambient temperature and the resin product is transported for storage. The product resin is preferably stable at ambient temperature for at least two weeks. The inventive resin is preferably utilized as a binder in the manufacture, for example, of man-made consolidated cellulosic boards, such as fiberboard. The inventive resin can be stored as an aqueous liquid, or as a powder by spray-drying the liquid form of the resin to make it into a powder form.

As is known in the art, a variety of other modifiers may be incorporated into the inventive resin in order to modify its properties. These modifiers include, for example: lignins, tannins, sugars, starches, glycols, polyols, and mixtures thereof. The proportion of these modifiers incorporated into the resin typically ranges from about 5 to about 35 weight percent based upon the phenolic component of the resin.

Two particularly preferred formulations of the inventive resin are shown in Table I and Table II below. The EMR of the resin of Table I is about 0.75 and the molar ratio of phenol to o-cresol is about 1:1. For the resin of Table II, the EMR is about 0.65 and the molar ratio of phenol to o-cresol is about 7:3.

TABLE I

| Reactant | Weight Percent (Based on Total Ingredients) | Concentration of Solution |
| --- | --- | --- |
| Phenol | 15.28 | |
| o-Cresol | 17.55 | |
| Caustic soda | 3.90 | 50 wt. % |
| Water | 22.60 | |
| Formaldehyde | 36.57 | 50 wt. % |
| Melamine | 4.10 | |
| | 100.00 | |

TABLE II

| Reactant | Weight Percent (Based on Total Ingredients) | Concentration of Solution |
| --- | --- | --- |
| Phenol | 22.69 | |
| o-Cresol | 11.17 | |
| Caustic soda | 4.14 | 50 wt. % |
| Water | 21.30 | |
| Formaldehyde | 36.36 | 50 wt. % |
| Melamine | 4.34 | |
| | 100.00 | |

Various resins formulated in accordance with the invention are shown in Table III below. The primary variables among the exemplative resins were (1) the molar ratio of phenol to o-cresol ("P:C Ratio") and (2) the equivalent molar ratio ("EMR") of formaldehyde to the total moles of phenol plus o-cresol. Other variables were (3) final resin viscosity and (4) the point of addition of melamine during condensation. Although each of the exemplative resins used melamine as the modifier, as described herein, other modifiers can be used. Each of the formulations used (a) a molar ratio of hydroxide catalyst to the total moles of phenol plus o-cresol of about 0.15:1 and (b) a molar ratio of melamine to the total moles of phenol plus o-cresol of about 1:10. (Resin A is similar to Resin B; however, the melamine modifier was added to the reaction mixture earlier, i.e., at a viscosity of A2-A1 on the Gardner-Holt scale. Resin E is similar to Resin I; however, Resin E was cooked to a higher viscosity, i.e., H-I on the Gardner-Holt scale, as opposed to D-E for Resin I. Resin G is similar to Resin H; however, Resin F was cooked to a higher viscosity, i.e., K-L on the Gardner-Holt scale, as opposed to D-E for Resin H.)

Table III also lists the known data of a control resin (referred to alternatively herein as commercial resin or "CR"), which is a commercially available resin and which is used by the assignee of the present application in commercial fiberboard processing using a blowline blending procedure. (Upon analysis, the control resin was found to lack o-cresol in its phenolic component.)

TABLE III

| Resin | Molar Ratio P:C | EMR | Viscosity [cps] | Solids [%] | Water Tolerance [%] | BWGT [min] |
| --- | --- | --- | --- | --- | --- | --- |
| A | 7/3 | 0.75 | 85 | 49.3 | 185 | 52.0 |
| B | 7/3 | 0.75 | 120 | 48.9 | 195 | 48.3 |
| C | 5/5 | 0.75 | 160 | 49.5 | 100 | 60.0 |
| D | 3/7 | 0.75 | 130 | 50.2 | 50 | 80.0 |
| E | 10/0 | 0.75 | 265 | 48.9 | 1200 | 29.6 |
| F | 10/0 | 0.65 | 190 | 49.7 | 700 | 36.2 |
| G | 7/3 | 0.65 | 590 | 50.9 | 170 | 45.7 |
| H | 7/3 | 0.65 | 135 | 50.4 | 160 | 58.4 |

TABLE III-continued

| Resin | Molar Ratio P:C | EMR | Viscosity [cps] | Solids [%] | Water Tolerance [%] | BWGT [min] |
|---|---|---|---|---|---|---|
| I | 10/0 | 0.75 | 135 | 49.2 | 800 | 30.1 |
| J | 5/5 | 0.65 | 135 | 50.1 | 85 | 71.9 |
| Control Resin | | about 0.5 | 85 | 60.0/50.0 | 400 | 43.5/48.2 |

**Resins D and J were not preferred due to a low stability for storage 25° C.

As shown in Table III, the equivalent molar ratio of formaldehyde to phenol and o-cresol ("EMR") was either about 0.65 or about 0.75 for each of the inventive resins. Thus, at least theoretically, there was enough formaldehyde to react with either about 65% or about 75% of the free, available reactive positions on the phenol and/or o-cresol rings (assuming that there was no condensation reaction before all the formaldehyde was consumed during the methylolation step).

The "real" molar ratios of formaldehyde to phenol and o-cresol (i.e., calculated from the EMR) for the inventive resins shown in Table III are much higher than the molar ratio of formaldehyde to phenol for at least one commercial resin ("CR"), which is about 1.6:1, according to information obtained from the manufacturer.

The higher molar ratios of formaldehyde to phenolics of the resins prepared in accordance with the invention were expected to yield a resin characterized by better bonding efficiency than the low molar ratio in the commercial resin because higher formaldehyde contents generally produce improved bonding. However, such high molar ratios of formaldehyde to phenolics also preferably (a) allow the reaction of free phenolic monomers with formaldehyde and (b) provide enough high molecular size distribution to prevent the possible volatilization of phenol and o-cresol, and/or the low molecular weight portion of the resin under the steam conditions of the blowline, as described above. All cooks of the inventive resins were terminated with melamine, which is nonvolatile with steam, to lower the overall molar ratio of formaldehyde to compounds which react with formaldehyde, and to increase the resin's precure resistance. (Even with the addition of melamine, the final formaldehyde ratio for all the synthesized resins presented in Table III are much higher than for the commercial resin ("CR"). The control resin ("CR") also is known to contain some urea, which would also further decrease the real molar ratio of formaldehyde to phenol, which for this resin equals about 1.6.)

In addition to the chemical characterization of the resins, Table III shows various physical characteristics of the resins. The boiling water gel time ("BWGT") and water tolerance ("WT") were analyzed.

Boiling water gel time, which can be used as an indicator of resin activity and precure resistance (when comparisons of resins are made at a given solids content), helps illustrate the reactivity of the inventive binder (e.g., how fast the resin can be cured). As will be understood by those of skill in the art, a higher BWGT indicates a lower reactivity and greater precure resistance.

As is apparent from Table III above, the greater the o-cresol content in the formulation, the slower the resin cure (higher BWGT) (and, thus, the greater resistance to precuring in blowline applications). For example, the BWGT of the resin having a phenol to o-cresol molar ratio of 3:7 was about 80.0. (In comparison, the commercial phenol-formaldehyde resin used as the control has a BWGT of about 43.5 minutes at 60% solids (or about 48.2 minutes at 50% solids).)

Table III also illustrates that a higher EMR will generally decrease the BWGT, when comparing samples which have a given ratio of phenol to o-cresol. In other words, the lower molar ratio of formaldehyde to phenolics, the slower the resin cure. Compare, for example, Resin C and Resin J, which differ in their respective EMR values. Resin C (EMR of 0.75) had a BWGT of 60.0 minutes, whereas Resin J (EMR of 0.65) had a BWGT of 71.9 minutes.

As shown by the data presented above, the resin activity and/or its precure resistance can be modified based upon the desired characteristics of the resin from considerably faster curing than Resin CR (Resin E has BWGT of 29.6 min. versus 48.2 min for Resin CR) to significantly slower than Resin CR (Resin C having a BWGT of 80 min.), by introducing a different degree of substitution of phenol by cresol and/or cooking the resin at different molar ratios of formaldehyde to phenolics.

With regard to water tolerance ("WT"), the incorporation of more o-cresol into the resin formulation (see the P:C molar ratio) results in significantly decreased resin water tolerance. The effect of varying the EMR does not appear to be significant, but by reducing the EMR of the resin, the resin water tolerance can be decreased slightly. Water tolerance is regarded as extremely important since resins with relatively low water tolerance preferably do not undesirably over penetrate into the wood fibers.

When resins such as those shown in Table III are analyzed by gel permeation chromatography ("GPC") to obtain values for the molecular size distribution of the resins, the resins preferably have higher molecular size distributions than the control resin. The molar ratio of phenol to o-cresol has the most significant effect on the values of (a) number average molecular weight, (b) weight average molecular weight, and (c) "Z" average molecular weight. The increase in o-cresol content and decrease in EMR usually yields a resin with a higher molecular size distribution.

Dynamic mechanical analysis was applied to characterize flow and cure properties of the analyzed resins. It was found that greater o-cresol contents usually resulted in better flow properties as evaluated by Tan Delta, and the slower resin as evaluated by the temperature at which the maximum rate of cure occurs. Resins C and G showed a thermoplastic character; after attaining certain storage module maximums, they start to soften again due to the temperature increase. In contrast, the control resin ("CR") results both in higher rigidity and in faster development of rigidity. However, the control resin was found to need a longer cure time to reach the final cure, which may be due to the presence of urea in the resin, the low molar ratio of formaldehyde to phenolics in the resin, and/or its high free phenol content.

Finally, all of the resins were evaluated by incorporating the resins into a fiberboard overlay with a waferboard substrate or underlay. The boards made with each type of resin were produced under the same conditions. The boards, which had a target density of about 0.7 g/cm³, included a commercial wood fiber substrate with 6 weight percent resin in the overlay, 5.5 percent of another commercial phenol-formaldehyde binder system in the waferboard underlay, 400° F. platen temperature, and 150 seconds cook time for resin production. The overlay hardness was rated using a Bel-Mawr Scrape Adhesion Tester.

The main variable for the experiment was blender application versus simulated blowline application. (The simulated blowline application included resin blender application at 20 percent furnish moisture content, followed by drying the furnish with the resin at about 200° F. (about 93° C.) in an oven to 8 percent moisture content, generally taking about 5–7 minutes.)

As seen in the sole FIGURE, the resins produced in accordance with the invention were significantly better regarding surface scratch resistance compared to the commercial resin ("CR"), as evaluated by the Bel-Mawr Paint Adhesion Tester. A greater scratch load indicates a better performing resin where all other factors are held constant. Even for the plant-made sample using a commercial blowline application ("Plant Control") with a resin content over 9 percent, the scratch load is below 1000 grams. All of the other resins made in accordance with the invention perform significantly better. (It should be mentioned that this data is used only as a basis of comparison between the samples, since no standard value exists which must be met in commercial production.)

From a comparison of two samples using Resin J at resin contents of 6 wt. % and 8 wt. %, it was also determined that the resin content in the overlay also has a significant effect on the scratch resistance. As expected, greater resin contents resulted in significantly better scratch loading. The effect of the specific gravity of the product on scratch loading was found to have some significance.

The preferred resins are Resin C (P:C of 1:1; EMR of 0.75) and Resin G (P:C of 7:3; EMR of 0.65), the formulations of which are found in Tables I and II above.

Since preferred Resin C (phenol to o-cresol molar ratio of about 5:5, or 1:1) contains a significant amount of difunctional cresol and exhibits outstanding thermoplastic properties in its cured state, while compared to the commercial resin, a further determination was made of the bonding efficiency of a similar o-cresol-modified resin. Resin J (similar to Resin C, but having a lower EMR value of 0.65) was evaluated as a function of internal bond values produced by the resin. Sixteen samples of two-inch square pieces of fiberboard overlays (on top of waferboard) were produced with Resin J at about 6 wt. % resin content. As shown in Table IV below, the testing (according to ASTM standards and expressed in psi) produced only two break outs in the overlays of the sixteen samples, and these break outs occurred at a minimum of 100 psi. (The other break outs occurred in the waferboard core or underlay.) These results indicate that even at high o-cresol content and an EMR value for formaldehyde to phenolics of about 0.65, the inventive resin exhibits very good bonding properties at 6 percent resin content in the fiberboard product.

TABLE IV

| | Internal Bond Strength of Resin J | | |
|---|---|---|---|
| Sample | Weight [lbs.] | Break Load [lbs.] | Internal Bond [psi] |
| 1 | 20.61 | 360 | 90 |
| 2 | 20.13 | 390 | 98 |
| 3 | 20.82 | 420 | 105 |
| 4 | 20.47 | 450 | 113 |
| 5 | 20.31 | 510 | 128 |
| 6 | 19.62 | 460 | 115 |
| 7 | 20.04 | 480 | 120 |
| 8 | 19.84 | 400 | 100 |
| 9 | 19.54 | 340 | 85 |
| 10 | 18.71 | 472 | 118 |
| 11 | 19.55 | 456 | 114 |
| 12 | 19.89 | 440 | 110 |
| 13 | 20.34 | 502 | 126 |
| 14 | 20.1 | 412 | 103 |
| 15 | 19.8 | 510 | 128 |
| 16 | 19.32 | 400 | 100 |

The inventive resin can be used in the manufacture of various types of wood composites such as those described above. The inventive resin is preferably used mixed with a cellulosic filler material via a blowline addition procedure.

A preferred method of manufacturing a fiberboard product with the inventive resin will now be described. It should be understood, however, that, as described above, the inventive resin is useful in processes for the manufacture of many different final products. Fiberboard materials, for example, include hardboard, medium density fiberboard, and the other materials described above.

A preferred process begins by first providing a suitable cellulosic filler from a fiberizing apparatus (e.g., a pressurized refiner). The wood fibers from a fiberizing apparatus are blended with the resin in the blowline.

The temperature of the atmosphere of the blowline is usually greater than about 300° F. (about 149° C.), and preferably about 340° F. (about 170° C.). The blowline pressure is preferably about 120 psi saturated steam pressure. The wood fiber added to the blowline is preferably completely saturated with moisture. Air turbulence of the blowline causes the binder to disperse onto the fibers.

Optionally, the fiber is subsequently passed through tube dryers which reduces fiber moisture content, e.g., to below 8 percent, based on the weight of dry fibers.

The resin-coated fibers are randomly formed into a mat. The moisture content of the mat which is formed after passing fiber with the resin through the tube dryer is preferably less than about 30 wt. %, more preferably less than about 10 wt. %, and most preferably less than about 8 weight percent, based upon the dry weight of the fibers. For very high density hardboard (e.g., hardboard having a density greater than about 1.0 g/cm³), it is preferred to have a moisture content at this point of less than about 6 weight percent, in order to avoid blistering and other surface defects during pressing.

The dry mat comprising wood fiber and binder resin preferably has a thickness of about two inches; however, this thickness is variable depending upon the thickness of the consolidated product, the type of cellulosic material being used, and pressing conditions, as well as the other process parameters.

The amount of binder resin used in the process is generally less than 20 weight percent, but can vary depending upon the other process parameters and intended use of the final product. However, the binder resin is preferably used at about 1 to about 12 weight percent, and more preferably about 1 to about 3 weight percent, based upon the weight of the fibers. However, it should be understood that the amount of resin is variable depending upon the other process parameters and desired final product.

After the mat has been formed, it is placed in a press where the mat is consolidated under heat and pressure to produce a molded wood composite. The inventive resin will require platen temperatures and press cycles which are typical for other phenolic resins. By way of example only, the pressing temperatures can be in the range of about 250° F. to about 550° F. (about 120° C. to about 288° C.).

The press pressure can be in the range of about 400 psi to about 850 psi, for example. The press time can be in the range of about 20 seconds to about 20 minutes (and more preferably in the range of about 30 seconds to 90 seconds). However, it should be understood that these conditions are variable depending upon the desired final product and that those of skill in the art will be able to make modifications based upon the desired final product.

When exposed to this heat and pressure, the thermosetting resin will be cured and the mat will be compressed into an integral consolidated structure. After the molded wood composite has been pressed, it can be transported for shipment or sale, or for coating, gluing or other finishing to complete a desired product.

The use of the resin is not limited to the manufacture of molded wood composites, and may be used in any process which demands a superior resin pre-cure resistance.

The foregoing description is given for clearness of understanding only, and no unnecessary limitations should be understood therefrom, as modifications within the scope of the invention will be apparent to those skilled in the art.

I claim:

1. A method for the production of a wood composite, comprising:
   (a) reacting a phenolic component comprising a phenol and/or a phenol derivative and an aldehyde at an equivalent molar ratio of aldehyde to phenolic component of about 0.55:1 to about 0.8:1 in the presence of an alkaline catalyst;
   (b) reacting a modifier with the product of step (a) to form a modified phenol-aldehyde resin, said modifier comprising melamine and/or urea;
   (c) providing a cellulosic filler;
   (d) combining said resin with said cellulosic filler under heat and with air turbulence;
   (e) forming the product of step (d) into a mat; and
   (f) consolidating said mat under heat and pressure to form a wood composite.

2. The method of claim 1, wherein:
   the molar ratio of said modifier to phenolic component is about 0.3 to about 3 moles modifier per 10 moles of phenolic component.

3. The method of claim 1, further comprising:
   subjecting the product of step (d) to a drying step prior to step (e).

4. The method of claim 1, wherein:
   said step (d) comprises a blowline blending procedure.

5. The method of claim 1, wherein:
   step (d) comprises subjecting said resin to a temperature of at least about 300° F. (about 149° C.).

6. A wood composite made by the method of any of claims 1, 2, or 5.

7. The wood composite of claim 1, wherein:
   said aldehyde comprises formaldehyde.

8. The method of claim 1, wherein:
   said phenolic component comprises a difunctional phenolic compound.

9. The method of claim 8, wherein:
   said difunctional phenolic compound comprises o-cresol.

10. The method of claim 1, wherein:
    said phenolic component comprises cresylic acid.

11. The method of claim 1, wherein:
    said phenolic component comprises a mixture of phenol and a difunctional phenolic compound.

12. The method of claim 11, wherein:
    the molar amount of phenol is greater than about 30 percent of the total molar amount of phenol plus said difunctional phenolic compound.

13. The method of claim 11, wherein:
    the molar ratio of phenol to said difunctional phenolic compound is in the range of about 7:3 to about 1:1.

14. The method of claim 1, wherein:
    said molar ratio of modifier to phenolic component is about 1:10.

15. The method of claim 1, wherein:
    said modifier comprises a mixture of melamine and urea.

16. The method of claim 1, wherein:
    the equivalent molar ratio of aldehyde to phenolic component is in the range of about 0.65:1 to about 0.75:1.

17. The method of claim 1, wherein:
    the molar ratio of aldehyde to phenolic component in step (a) is in the range of about 1.65:1 to about 2.4:1.

18. A method for the production of a cellulosic composite, comprising:
    (a) reacting a phenolic component comprising a phenol and/or a phenol derivative and formaldehyde at an equivalent molar ratio of formaldehyde to phenolic component of about 0.65:1 to about 0.75:1 in the presence of an alkaline catalyst;
    (b) reacting a modifier with the product of step (a) to form a modified phenol-formaldehyde resin, said modifier comprising melamine and/or urea;
    (c) providing a cellulosic filler comprising wood fibers;
    (d) combining said resin with said cellulosic filler under heat and with air turbulence;
    (e) forming the product of step (d) into a mat; and
    (f) consolidating said mat under heat and pressure to form a cellulosic composite.

19. The method of claim 18, wherein:
    said phenolic component comprises a difunctional phenolic compound.

20. The method of claim 19, wherein:
    said phenolic component comprises a mixture of phenol and a difunctional phenolic compound and the molar ratio of phenol to said difunctional phenolic compound is in the range of about 7:3 to about 1:1.

* * * * *